(12) United States Patent
Delaney, Jr.

(10) Patent No.: US 8,977,634 B2
(45) Date of Patent: Mar. 10, 2015

(54) SOFTWARE METHOD TO CREATE A MUSIC PLAYLIST AND A VIDEO PLAYLIST FROM UPCOMING CONCERTS

(76) Inventor: Timothy Quinn Delaney, Jr., Chicago, IL (US)

( * ) Notice: Subject to any disclaimer, the term of this patent is extended or adjusted under 35 U.S.C. 154(b) by 319 days.

(21) Appl. No.: 13/482,294

(22) Filed: May 29, 2012

(65) Prior Publication Data

US 2012/0304064 A1  Nov. 29, 2012

Related U.S. Application Data

(60) Provisional application No. 61/490,623, filed on May 27, 2011.

(51) Int. Cl.
   *G06F 17/30* (2006.01)
   *G06F 3/01* (2006.01)
   *G11B 27/32* (2006.01)

(52) U.S. Cl.
   CPC ........ *G06F 17/30769* (2013.01); *G11B 27/329* (2013.01); *G06F 17/30053* (2013.01); *G06F 17/30772* (2013.01)
   USPC ........................................................ 707/754

(58) Field of Classification Search
   CPC .................. G06F 17/30772; G06F 17/30053; G06F 17/30038; G06F 17/30749; G06F 17/30752; G06F 17/30041; G06F 17/30017; G06F 17/30044; G06F 17/30769; H04N 21/4825; H04N 21/4325
   USPC ........................................................ 707/754
   See application file for complete search history.

(56) References Cited

U.S. PATENT DOCUMENTS

2009/0248702 A1 * 10/2009 Schwartz et al. ............... 707/10
2011/0040657 A1 *  2/2011 Roswell ........................ 705/27.1
2011/0295875 A1 * 12/2011 El Daher et al. .............. 707/769

* cited by examiner

*Primary Examiner* — Pierre Vital
*Assistant Examiner* — Evan Aspinwall

(57) ABSTRACT

The present invention is a software application that is capable of producing a music playlist or a video playlist according to upcoming concerts and a plurality of narrowing criteria. The software application can be accessed through a web browser. A concert database is searched to find all related concerts according to inputted concert narrowing criteria. A music playlist is generated by retrieving all artist tracks within a music database matching a plurality of music narrowing criteria. A video playlist is generated by retrieving all artist videos within a video database matching a plurality of video narrowing criteria. Music playing software and video playing software are provided to play the music playlist and the video playlist. The music playlist and the video playlist can continuously update according to updating criteria. Comedy and other non-music related acts at a concert can also be implemented into the music playlist and the video playlist.

14 Claims, 15 Drawing Sheets

SOFTWARE METHOD TO CREATE A MUSIC PLAYLIST AND A VIDEO PLAYLIST FROM UPCOMING CONCERTS

The current application claims a priority to the U.S. Provisional Patent application Ser. No. 61/490,623 filed on May 27, 2011. The current application is filed on May 29, 2012 while May 27, 2012 was on a weekend.

FIELD OF THE INVENTION

The present invention relates generally to a software application that allows an electronic device to create a music playlist or a video playlist. More particularly, the object of the present invention is to provide a user with a software application to find concerts according to a user's inputted criteria and to create a music playlist or a video playlist from such inputted criteria.

BACKGROUND OF THE INVENTION

Attending concerts and listening to music is a favorite activity for many individuals. However, the process of searching for upcoming concerts according to location, venue, date or artist can be very time consuming due to the many different sources of concert data to search. The entirety of the artists and/or performers within these concerts is typically unknown to the individual before attending the concert. Once the individual attends the concert, the individual may eventually or instantly become a fan of a portion or all of these unknown artists. If an individual is attending a music concert, this individual may desire to listen to some of the music beforehand from the artists performing at the music concert that they would expect to hear. Also, the individual may want to view some of the videos produced by these artists beforehand as well. Even if the individual is not planning to attend the concert, a music playlist or video playlist related to the concert would often be desired as well. There is a large amount of data that includes artist's tracks and videos and it may seem overly daunting to the individual to find a particular song or video that would be relevant to include in a playlist.

The method to search and find the known artists, along with the unknown artists that are performing at a concert so that a music playlist or video playlist can be produced can be very difficult due the aforementioned multitude sources of data and the many different platforms the artists use to release their work. Oftentimes, a single song or a few songs from an artist's archive is only desired to be listened to, which can be overly difficult to find because an individual may be unaware which piece of work is the most relevant or the most popular. Narrowing criteria is needed to assist these individuals in finding a more concise set of tracks or videos. It is therefore an object of the present invention to provide a method in which individuals can use a centralized system to create a playlist of songs or videos for the purpose of previewing upcoming concerts by simply choosing a few filtering options.

DETAIL DESCRIPTIONS OF THE INVENTION

Figure 1:
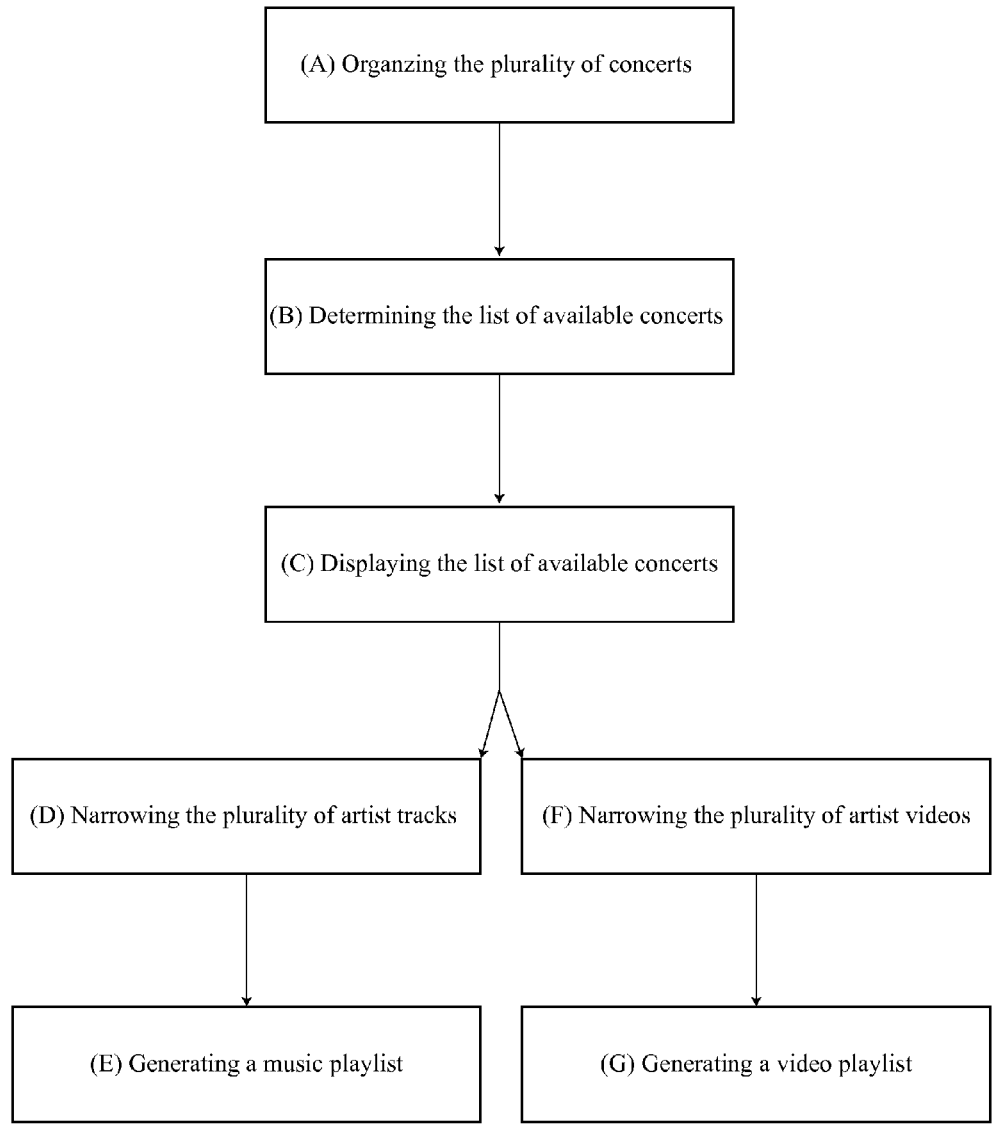
FIG. 1 is a flow chart illustrating the overall process that is followed by the present invention.

All illustrations of the drawings are for the purpose of describing selected versions of the present invention and are not intended to limit the scope of the present invention.

The present invention is a software application that is intended to find a list of available concerts and to generate a music playlist or video playlist that correspond to a given set of inputted criteria. The user may filter the concerts within a concert database according to a set of concert search criteria. These concerts could be filtered by the popularity (number of tracks or tickets sold in the past year or in their career) of the headliner or of the supporting acts. The user may filter the concerts based on location (zip code or city, state), date (date range or day of week), cost, venue size, etc. The user could also select specific venues, music festivals, or all festivals. Also, the user could choose to play all songs by the artist, singles, their greatest hits, the songs they are currently playing on their tour, or just their latest release. In addition, the user could filter concerts by genre of music. The user should also be able to generate a list of bands that they like. The music playlist or the video playlist would only include songs by the list of bands they like based upon other concert search criteria—similar bands to the list of bands they like could also be included with the music playlist or video playlist. These playlists and user preferences could be saved in an online database which would be accessible via a user's playlist account.

In the preferred embodiment of the present invention, it is a web page application that a user is able to operate while connected to the internet on an electronic platform such as a computer, a smart phone, a tablet or any other similar existing or future internet connected device that has a graphic user interface. The graphic user interface is essentially the viewable portion of a web page application or electronic software. The present invention should not need to be installed onto either of these electronic platforms and should be able to be accessed simply through any compatible web browsers. However, the present invention should not be limited to a web page application and could be installed onto the electronic platforms as aforementioned. A user should only need to reach the corresponding web page in order to access and operate the present invention. The present invention is able to search through a concert database to find a list of available concerts matching the user's inputted criteria. Furthermore, a music playlist or even a video playlist can be created from the list of available concerts by also searching a music database for artist tracks or a video database for artist videos. A user should be able to select a few or all of the concerts from the list of available concerts to create these playlists according to a plurality of music narrowing criteria and a plurality of video narrowing criteria. The music playlist is generated after selecting the concerts from the list of available concerts and after inputting the music narrowing criteria. This music playlist should be played through music playing software and the video playlist should be played through video playing software; however the music playlist and the video playlist both could be played through a universal media playing software if it is provided. Therefore, the present invention provides a user with the ability to generate a music playlist or a video playlist that includes media from artists that may have previously been unknown to them.

Figure 2:
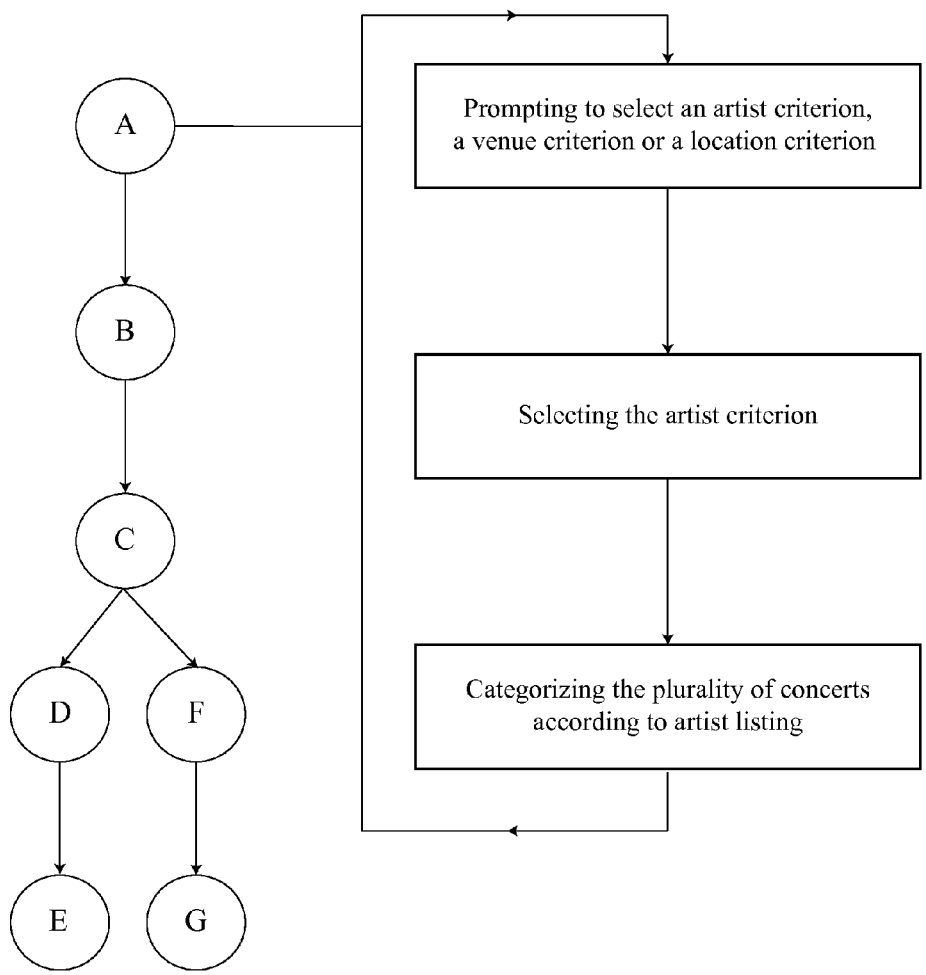
FIG. 2 is a flow chart illustrating the secondary process of organizing the plurality of concerts within the concert database according to an artist criterion.
Figure 3:
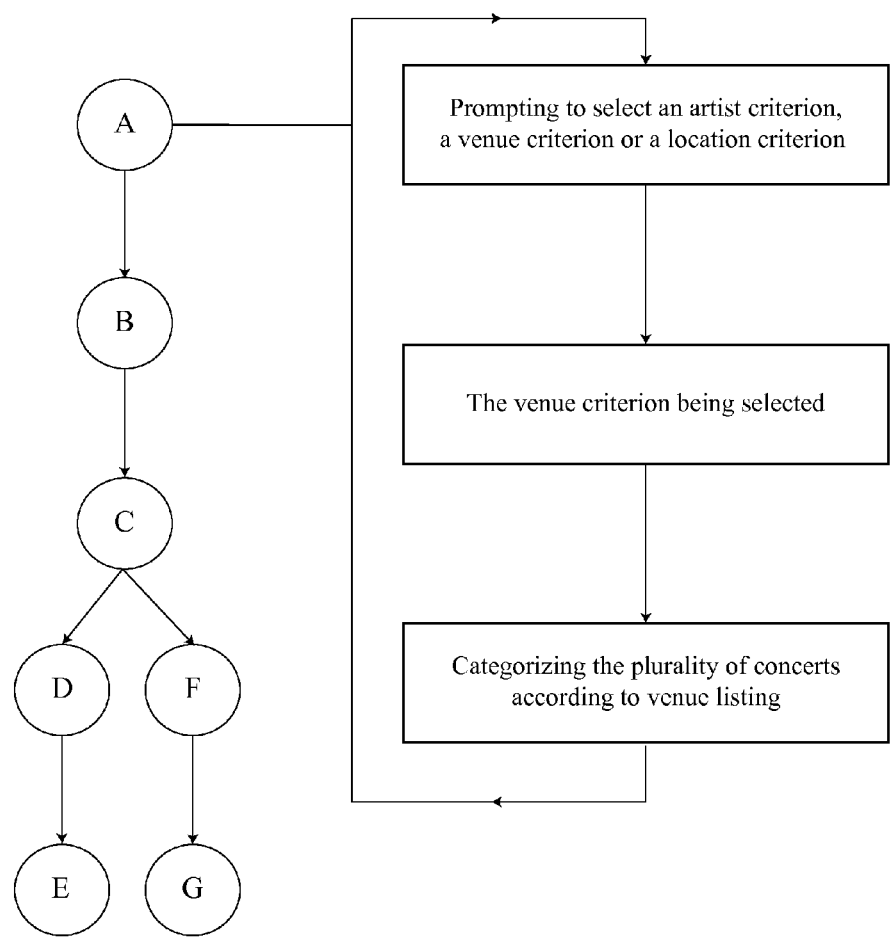
FIG. 3 is a flow chart illustrating the secondary process of organizing the plurality of concerts within the concert database according to a venue criterion.
Figure 4:
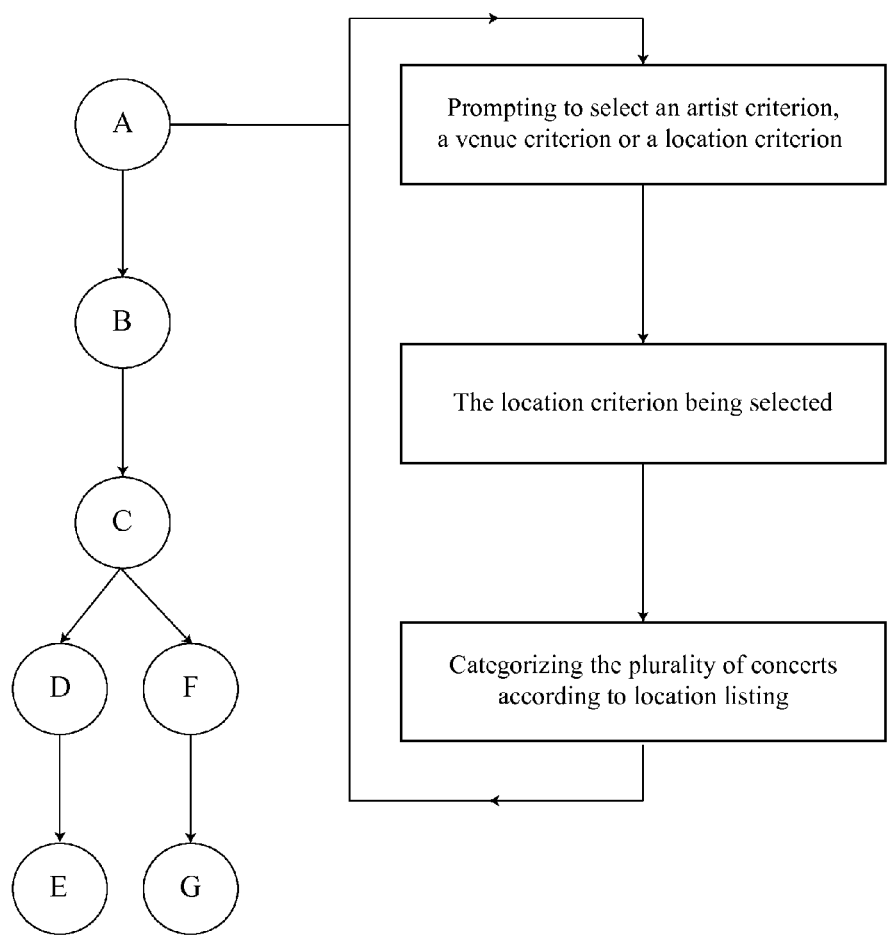
FIG. 4 is a flow chart illustrating the secondary process of organizing the plurality of concerts within the concert database according to a location criterion.
Figure 5:
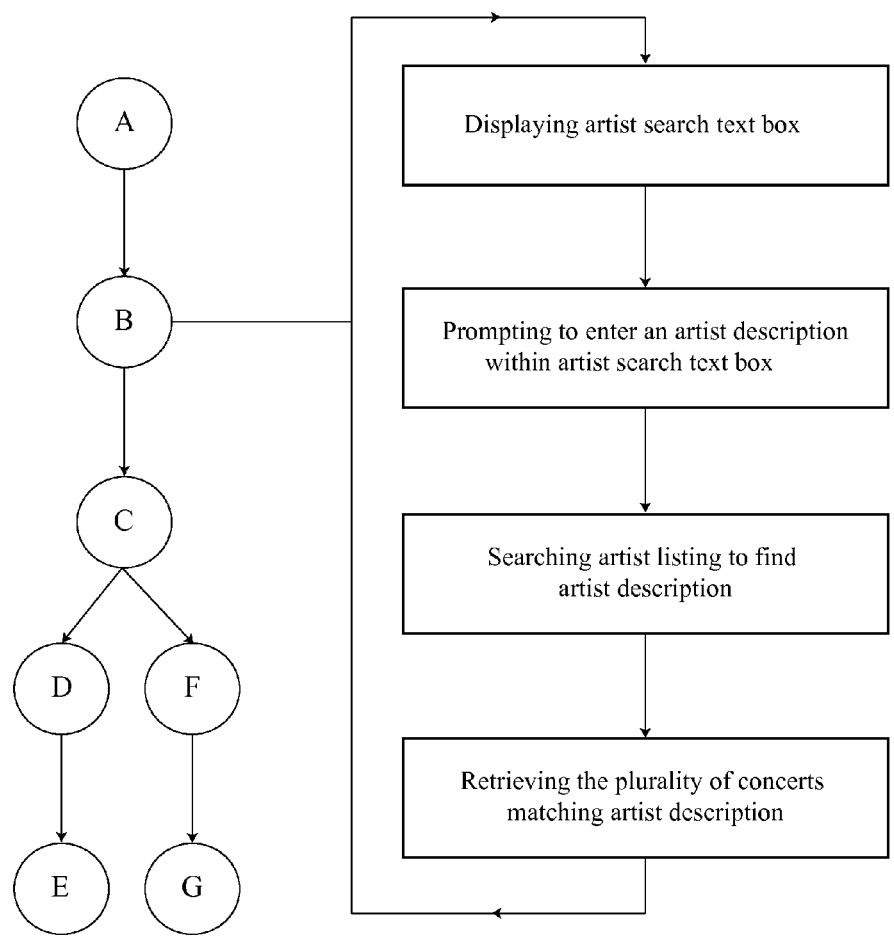
FIG. 5 is a flow chart illustrating the secondary process of determining the list of available concerts according to an artist description.
Figure 6:
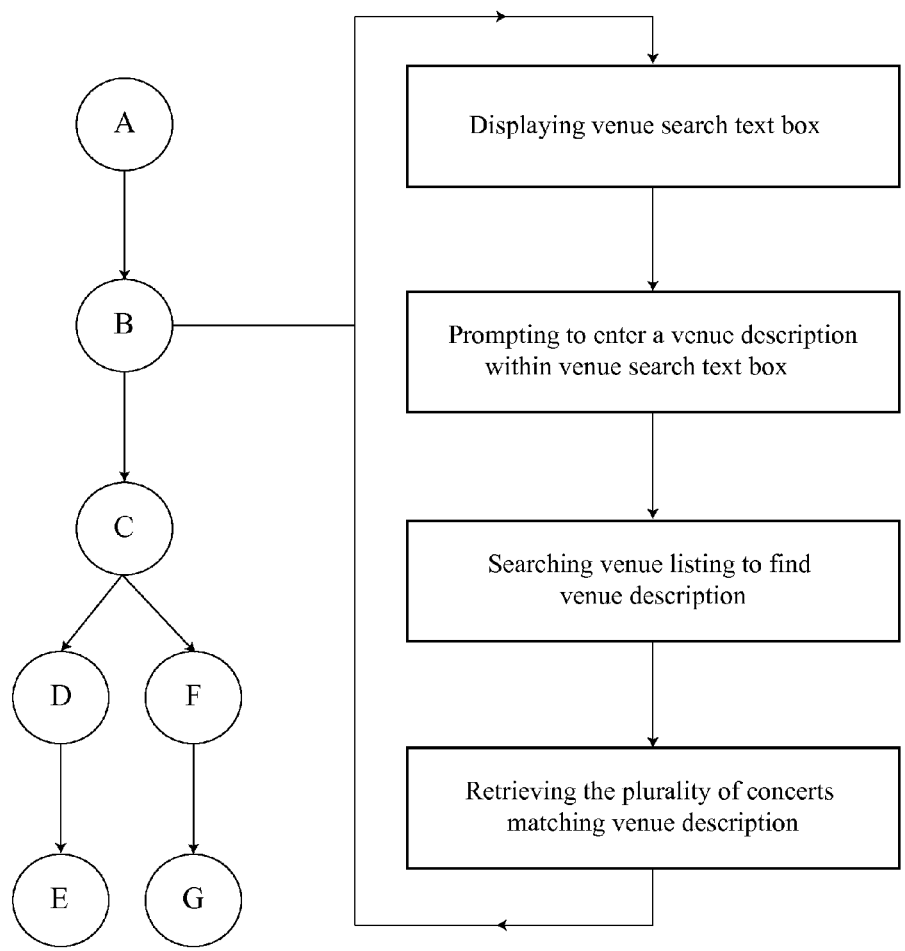
FIG. 6 is a flow chart illustrating the secondary process of determining the list of available concerts according to a venue description.
Figure 7:
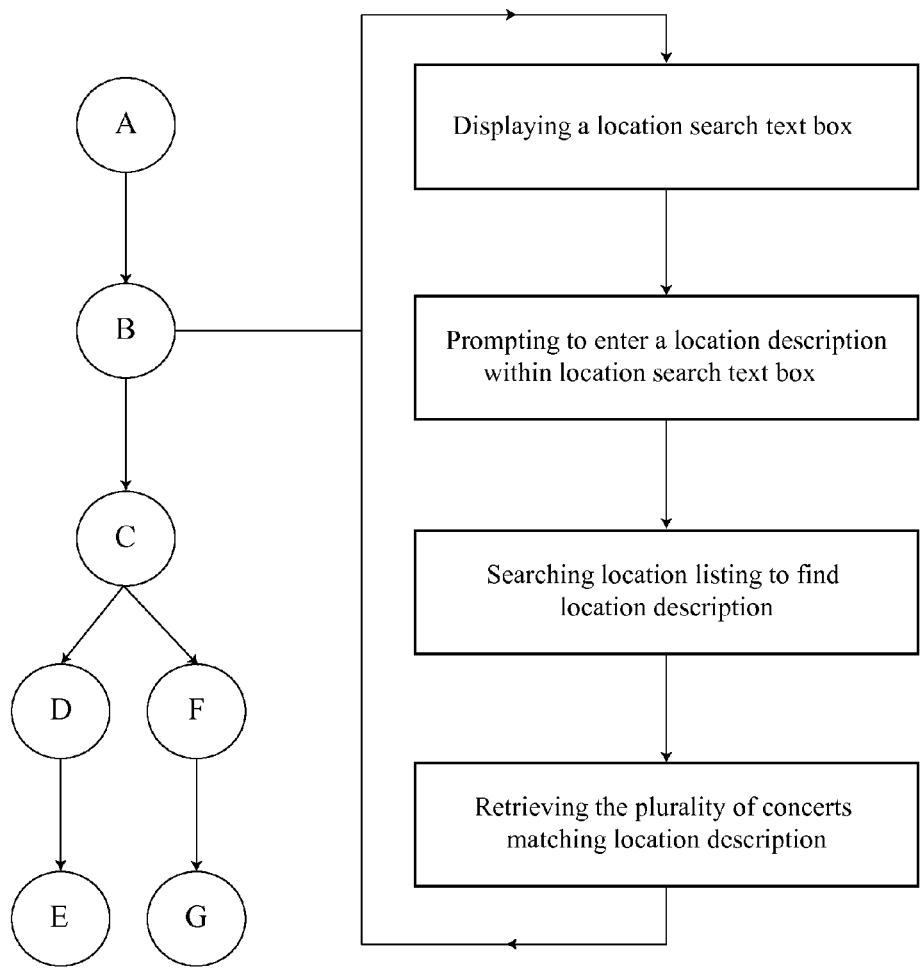
FIG. 7 is a flow chart illustrating the secondary process of determining the list of available concerts according to a location description.
Figure 8:
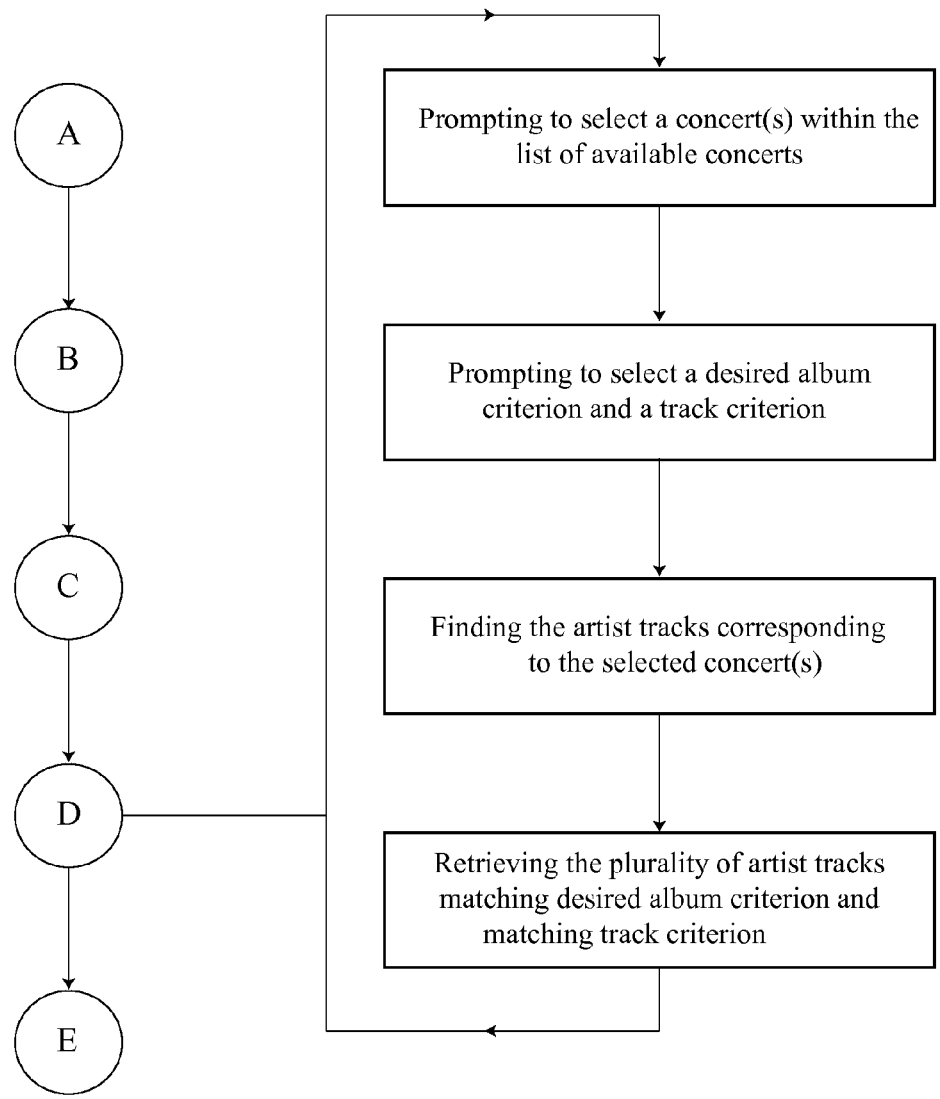
FIG. 8 is a flow chart illustrating the secondary process of narrowing the plurality of artist tracks within a music database according to a given criteria.
Figure 9:
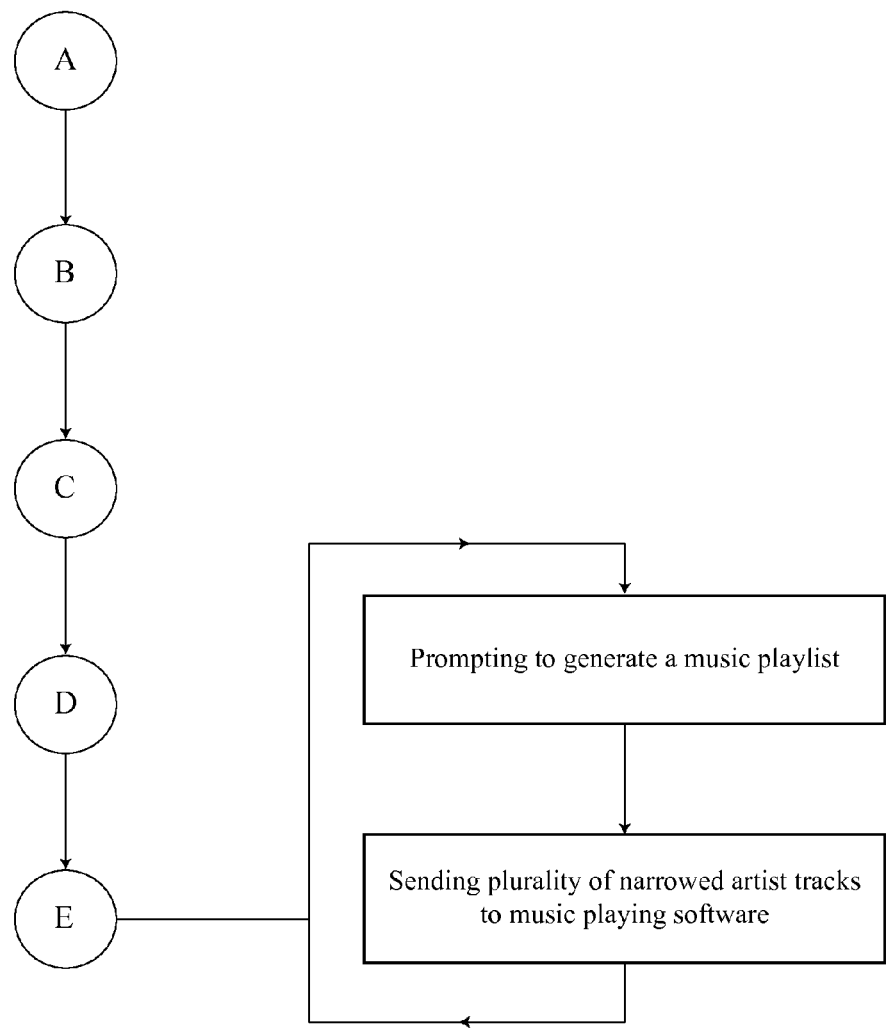
FIG. 9 is a flow chart illustrating the secondary process of generating the music playlist given a plurality of narrowed artist tracks.
Figure 10:
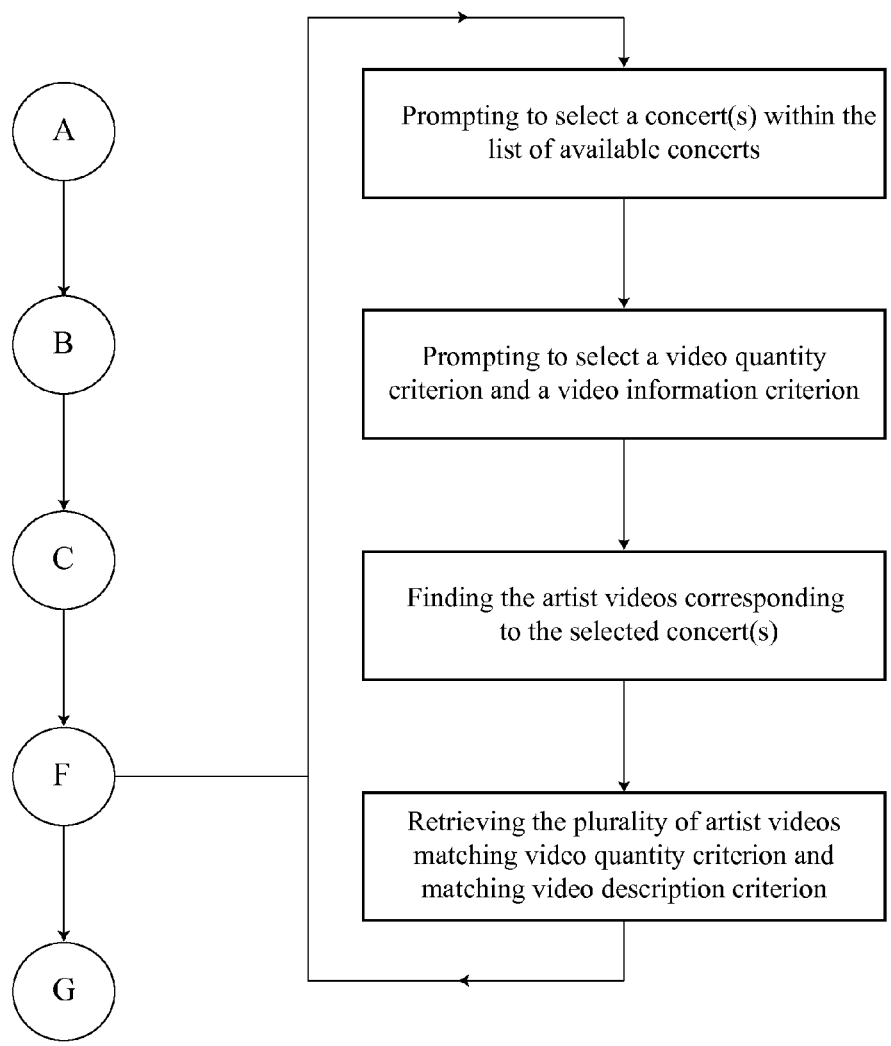
FIG. 10 is a flow chart illustrating the secondary process of narrowing the plurality of artist videos within a video database according to a given criteria.
Figure 11:
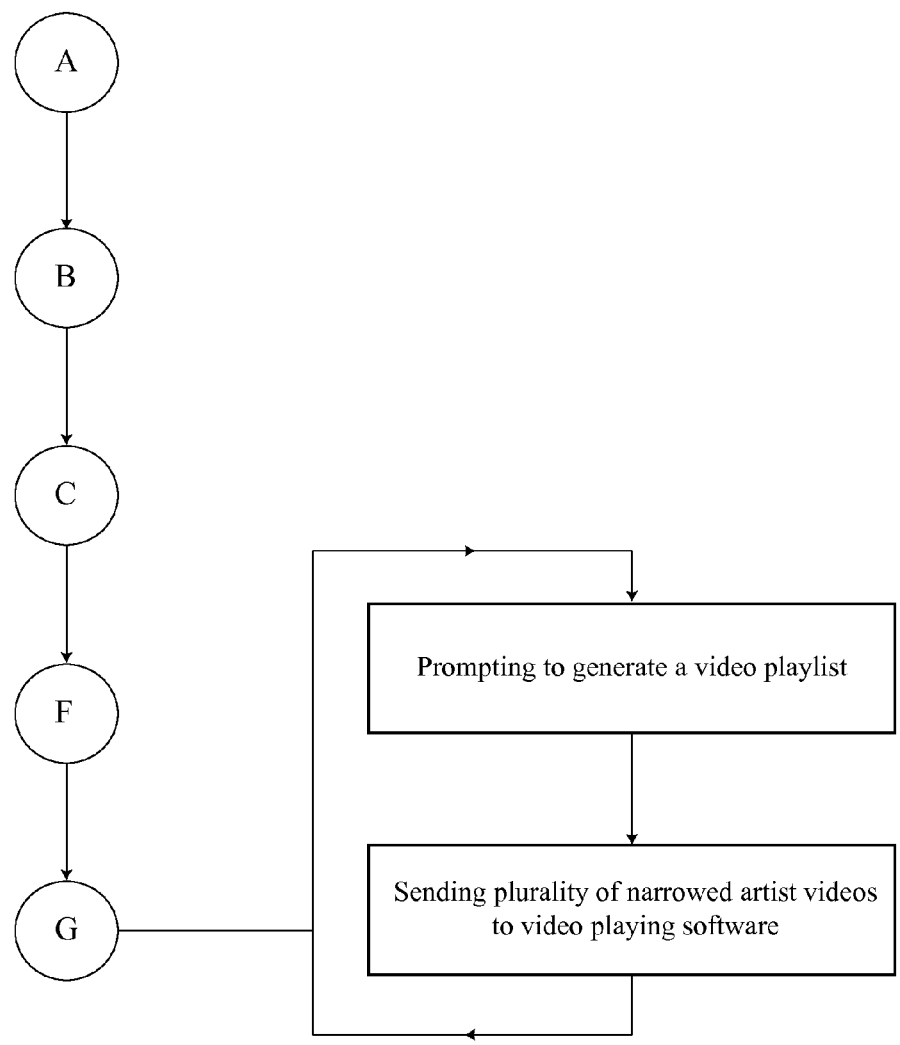
FIG. 11 is a flow chart illustrating the secondary process of generating the video playlist given a plurality of narrowed artist videos.

As can be seen in FIG. 1, the primary steps to create a music playlist and a video playlist in a software perspective is delineated in the form of a flowchart; concurrently, FIG. 2-FIG. 11 generally describes each individual process to reach the end goal of a music playlist and a video playlist. The overall process begins by organizing the concert database according to a plurality of concert search criteria. Preferably, the plurality of concert search criteria includes an artist criterion, a venue criterion and a location criterion; although, additional criterion could be included for as long as the process remains the same. The user is prompted to select from the plurality of concert search criteria to begin narrowing their concert search. Each criterion, upon being selected, organizes the plurality of concerts within the concert database differently. The general process to organize the plurality of concerts within the concert database upon each criterion being selected is shown in FIG. 2-FIG. 4. If the artist criterion is selected by the user, the software categorizes the plurality of concerts according to artist listing. Each concert within the concert database includes an artist listing, a venue listing, a location listing and a date listing. The artist listing is essentially a list of artists that are performing at the specified concert. The venue listing is the specific venue the concert is being held at. The location listing is the specific city, state, or local metro area that the concert is occurring. The date listing is simply the specific date the concert is to begin. These are the primary descriptions and listings that a concert would typically include. More detailed descriptions and listings could also be provided for each concert within the concert database to generate a more comprehensive concert search. If the venue criterion is selected, the plurality of concerts is categorized according to venue. Similarly, the plurality of concerts is categorized according to location if the location criterion is selected. It is necessary to sort the plurality of concerts according to this method because an artist, venue or location may be exactly the same according to their text, which would cause difficulty in appropriately searching the concert database-searching the artist "Chicago" might return concerts with the artist "Chicago" while also returning concerts that are in Chicago, Ill. Clearly, this is incorrect and an undesired function of a concert search. Although this is a simple process, it is an important initial step in the overall process.

The next step delineated by the flowchart in FIG. 1 is to determine the list of available concerts. Determining the list of available concerts begins once a criterion within the plurality of concert search criteria has been selected. The general steps to determine the list of available concerts are delineated by the flowcharts shown in FIG. 5-FIG. 7. After a criterion has been selected, a text box or a similarly functioning graphic should appear for a user to input a description related to the selected criterion. The user should be prompted to input the description within the text box. Upon receiving the input from the user, the plurality of concerts is searched to find a concert or a plurality of concerts matching the description. If the user desires to search for concerts that include an artist, the artist criterion should be selected first. Once the artist criterion has been selected by the user, they should thereafter be prompted to enter an artist description within an artist search text box. The user should then enter a name of an artist into the artist search text box. Upon fully entering the name of the artist, the plurality of concerts having been categorized by artist listing should be searched to find a concert or plurality of concerts that matches the artist description. The concert(s) matching the artist description that are found are compiled into a list, which is denoted as the list of available concerts. Thereafter the list is displayed on the graphic user interface. Similarly, if the user desires to search for concerts by venue, then the user should select the venue criterion first. Once the venue criterion has been selected, the user should be prompted to enter a venue description within a venue search text box. Since the venue criterion has been selected, the plurality of concerts within the concert database have already been categorized by venue listing, so the plurality of concerts should be searched to find any concert(s) that match the venue description as fully entered into the venue search text box. Each matching concert is then compiled into the list of available artists and displayed on the graphic user interface. A similar process should be performed upon a criterion within the plurality of concert search criteria being selected first and the related description being entered into its corresponding search text box. Additionally, the present invention should have the capability of searching the concert database according to multiple criteria being selected rather than only a single criterion. The plurality of concerts may need to be organized in a dissimilar manner as aforementioned in order to provide this additional function; however, this should still be within the scope of the present invention and the present invention should not be limited to compiling the list of available concerts by a single criterion.

Once the list of available concerts has been presented to the user on the graphic user interface, the user must then choose to either generate a music playlist or a video playlist. However, the user is not bound to generate only a single playlist, meaning both the music playlist and the video playlist can be generated independently of the other. In order to generate the music playlist, the music database with a plurality of artist tracks should be provided, and in order to generate the video playlist, the video database with a plurality of artist videos should also be provided. Before these playlists can be generated, the plurality of artist tracks and/or the plurality of artist videos needs to be narrowed according to another set of criteria. In order to narrow the plurality of artist tracks so that a user does not receive the entirety of each artist's discography within the list of available concerts in the music playlist, a plurality of music narrowing criteria should be provided to the user. The general steps to narrow the plurality of artist tracks corresponding to the list of available concerts are delineated by the flowcharts shown in FIG. 8-FIG. 9. Preferably, the plurality of music narrowing criteria should include a desired album criterion and a track popularity criterion. The desired album criterion should find the plurality of artist tracks according to the order they were released (most current to the first released album). The track popularity criterion should find the most popular tracks, according to billboard rankings, the number of plays by the music playing software, or another similar method that corresponds to the selected desired album criterion. For example, the track popularity criterion could include the top track from each of the selected desired albums, the top two tracks, the top three, and so on. It should be known that any criterion related to the narrowing of the plurality of artist's tracks could be provided and the present invention should not be limited to the aforementioned criteria. The initial step to narrow the artist tracks should be to prompt the user to select a concert or a plurality of concerts from the list of available concerts. Preferably, a concert selection check box should be displayed next to each concert within the list of available concerts so that a user can clearly mark which concerts are to be narrowed; however any similar method could be used to mark each concert within the list of available concert to be narrowed. This allows the user to narrow the artists and their corresponding plurality of artist tracks that are to be included within the music playlist. After selecting the desired concerts within the list of available concerts, the user should then be prompted to choose from each of the plurality of music narrowing criteria. Upon the user selecting the concerts within the list of available concerts and selecting each criterion within the plurality of music narrowing criteria, each corresponding track within the plurality of artist tracks should be retrieved and compiled into a list, which is denoted as the music playlist. Thereafter, the music playlist should be sent to the music playing software so that it can be audibly played to the user.

Generating a video playlist should follow a similar process as generating a music playlist. The general steps to narrow the plurality of artist videos corresponding to the list of available concerts are delineated by the flowcharts shown in FIG. 10-FIG. 11. In order to narrow the plurality of artist videos so that a user does not only receive the entirety of the artist videos in the video playlist, a plurality of video narrowing criteria should be provided to the user. The plurality of video narrowing criterion should include a video quantity criterion and a video information criterion. The video quantity criterion should find the plurality of artist videos according to the artist's top 5 videos, top 6-10 videos, etc. These options would be presented to the user for the user to select. The video information criterion should find artist videos according to their relevance, view count, published date or rating, corresponding to the selected video quantity criterion. It should be known that any criterion related to the narrowing of the plurality of artist's videos could be provided and the present invention should not be limited to the aforementioned criteria. The initial step to narrow the artist videos should be to prompt the user to select a concert or a plurality of concerts from the list of available concerts. After selecting the desired concerts within the list of available concerts, the user should then be prompted to choose from each of the plurality of video narrowing criteria. Upon the user selecting the concerts within the list of available concerts and selecting each criterion within the plurality of video narrowing criteria, each corresponding video within the plurality of artist videos should be retrieved and compiled into a list, which is denoted as the video playlist. Thereafter, the video playlist should be sent to the video playing software so that it can be visually played, and in most instances also audibly played, to the user.

The present invention should also have the capability to generate both the music playlist and video playlist through a universal media playing software if provided. With the integration of most electronics, it is likely a single media playing software application could generate both the music playlist and the video playlist. The present invention should not be limited to providing only video playing software and a music playing software and could include an integrated media playing software that provides both functions.

Preferably, the present invention should display a list of available concerts near a user's current location prior to performing a concert search. This should occur as soon as the user accesses the present invention. The present invention should acquire the internet protocol address (IP address) from the electronic platform being used. The user location from the IP address should then be determined by the present invention and a concert search should be automatically conducted according to this location. Therefore, the plurality of concerts within the concert database would be categorized by the location listing and then searched to find the concert or plurality of concerts matching the user location.

The present invention should not be limited to music related artists and music related concerts and could include comedians, theatre performers or any similar or related performers in a concert. This would allow a user to create a music playlist that includes comedian tracks or a video playlist that includes comedy shows related to a comedian, for example. Further narrowing criteria would be provided for these instances in order to correctly return the list of available concerts and the corresponding music playlists and video playlists.

The user should also be provided options as to how the music playlist or the video playlist would be sorted. Preferably, the music playlist and the video playlist should be set by default to shuffle the artist tracks and the artist videos, respectively. However, the user could also sort the music playlist and the video playlist by popularity, concert location (closest concerts first), date (earlier concerts first), cost or venue size, as examples. The music playlist and the video playlist should not be limited to any specific sorting method.

The present invention may provide a music playing account or a video playing account in order for the music playlist or the video playlist to be played. The music playing account would be linked with the music playing software and the video playing account would be linked with the video playing software. After linking, the playlists will be automatically loaded into their respective playing software. Although, the present invention should not be limited to require a music playing account and could operate without needing such accounts to be linked.

The concert database can be an online database of concerts or a concert database engine that searches the internet for listed concerts for a much broader concert search. In this instance, the concert database would be linked with the largest provided database of concerts; however the user should have the option to choose which concert database they would prefer to be searched. Similarly, the music database could be an online database of artist tracks or a local storage of artist tracks on the electronic platform that the preset invention operates; the video database could be an online database of artist videos or a local storage of artist videos on the electronic platform that the present invention operates.

Figure 12:
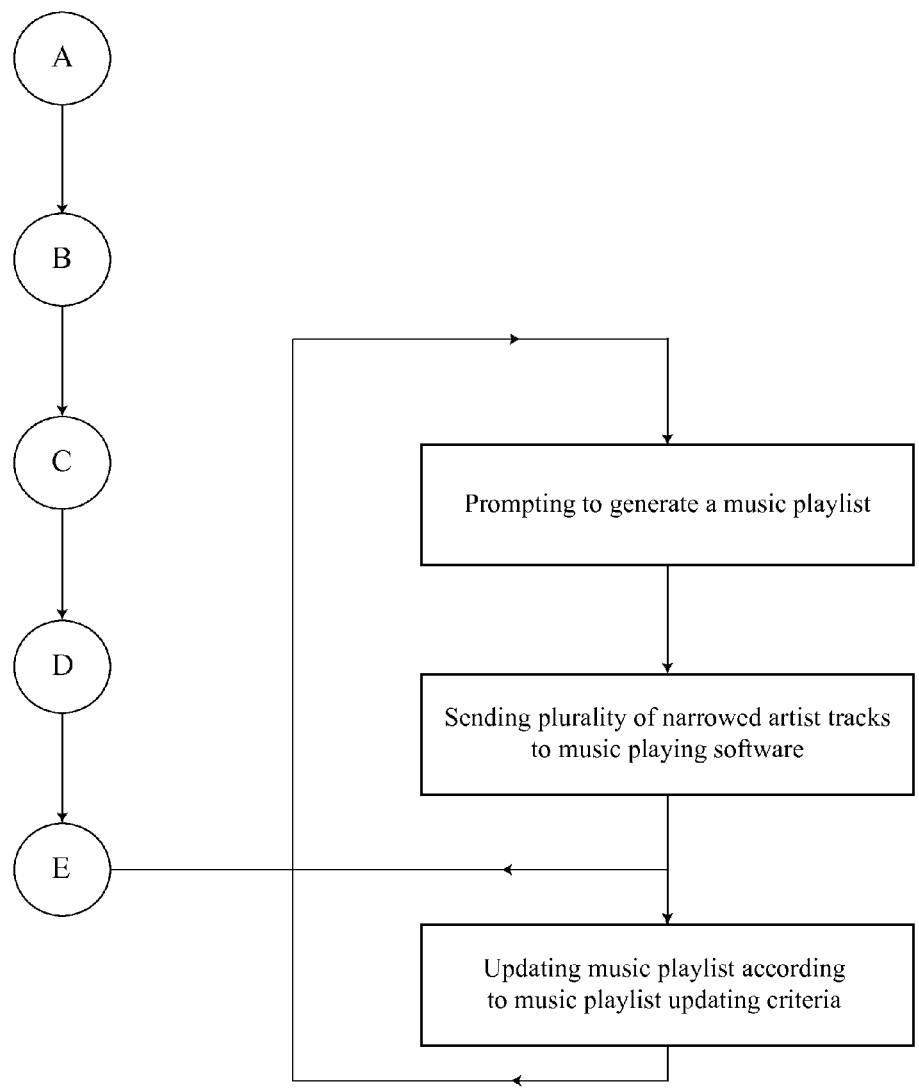
FIG. 12 is a flow chart illustrating the secondary process of updating a music playlist.
Figure 13:
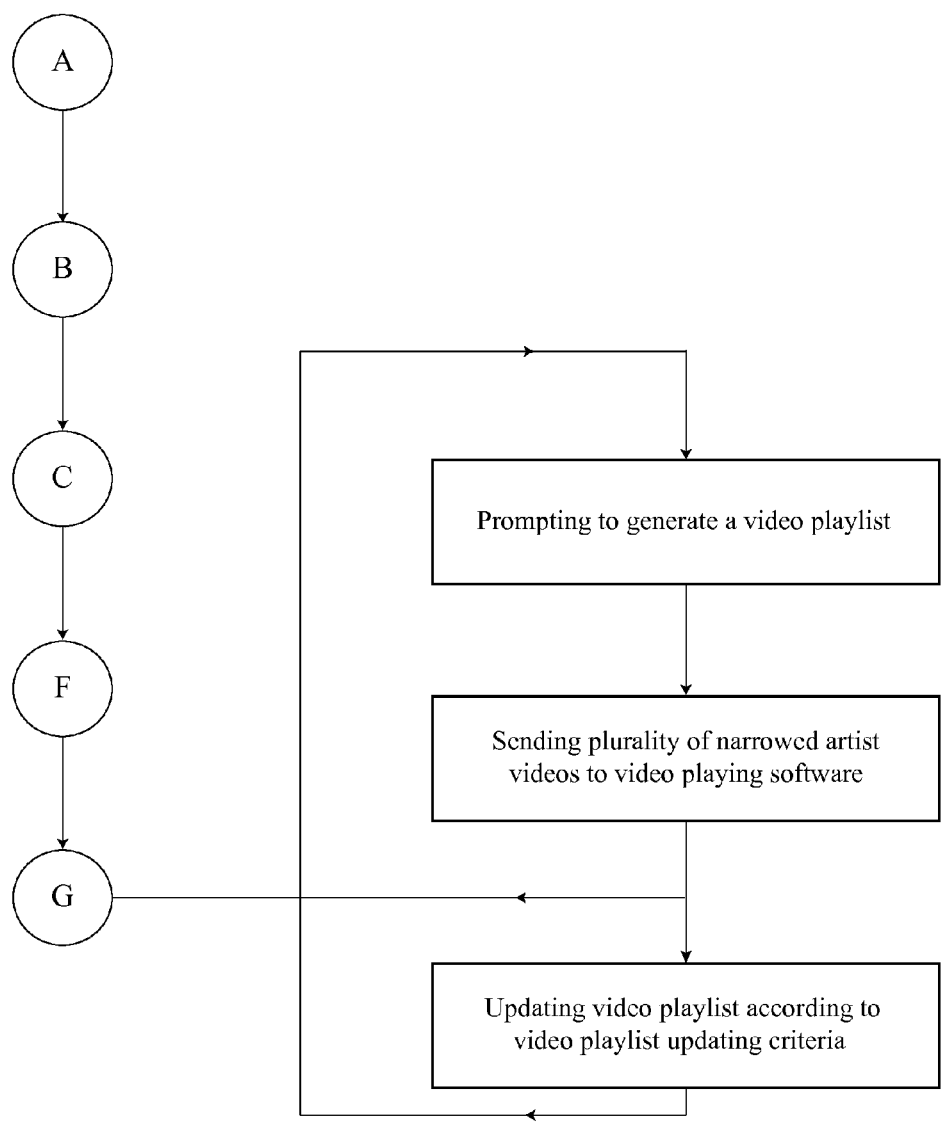
FIG. 13 is a flow chart illustrating the secondary process of updating a video playlist.

A user may have the option to automatically update their music playlist or their video playlist as new concerts are announced, concerts are canceled or when the date of a concert has passed according to a music playlist updating criteria. This secondary process is generally illustrated in FIG. 12. For example, the user may choose to have concerts added within a selected date range of one to ten weeks according to the date they begin. The music playlist could also be updated daily. If the user is using their desktop media player, a synchronization process would run in the background to update the music playlist. Also, the video playlist can be updated in a similar manner, as is shown in FIG. 13. A video playlist updating criteria should be provided instead.

Figure 15:
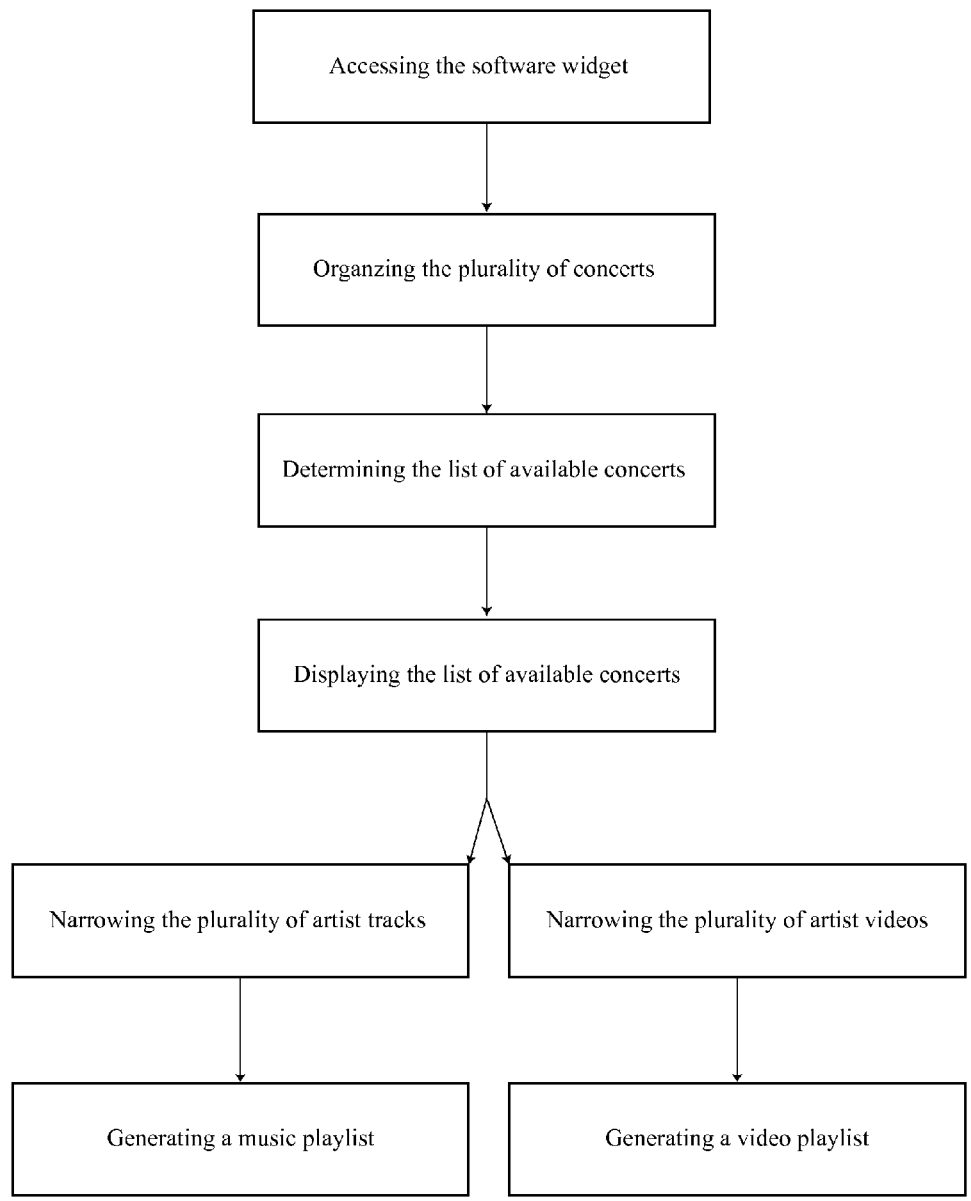
FIG. 15 is a flow chart illustrating the overall process of the software widget.

Concert venues may implement the present invention and have a software widget placed on their respective websites which would allow other users to preview all the upcoming concerts at the venue and to generate the music playlist or the video playlist. This is illustrated in FIG. 15. A user operating a website of a venue should be able to generate a music playlist or a video playlist by accessing the present invention through the software widget. Essentially, the software widget can be added to any electronic communication device so that the present invention can be accessed. If the user desires to only preview the upcoming concerts, then the user should only need to input the appropriate criteria to attain the list of available concerts. These concert venues may also generate music playlists or video playlists to be played before, during or after a concert.

Figure 14:
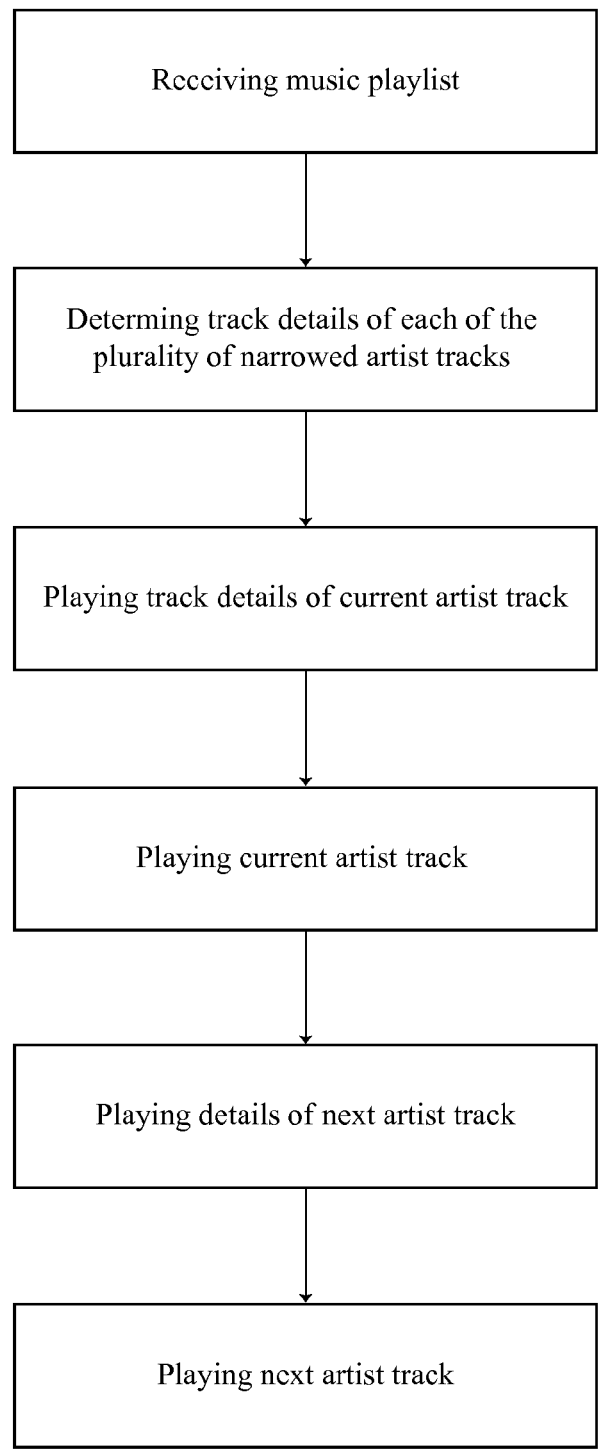
FIG. 14 is a flow chart illustrating the overall process of the music playing software.

The present invention may also implement a read aloud feature which would have the details of the song (artist, album, song name, etc) be read aloud and/or after by a computer voice. This secondary process is illustrated in FIG. 14. Concert details (location, date, time, and cost) could also be read aloud. Adding these options will give the playback experience a traditional radio feel. The music playing software would first receive the music playlist and then determine the track details of each of the plurality of narrowed artist tracks. Before playing the current track, the track details of the current artist track should be played using the computer voice. This process would repeat for each following artist track within the music playlist.

Although the invention has been explained in relation to its preferred embodiment, it is to be understood that many other possible modifications and variations can be made without departing from the spirit and scope of the invention as hereinafter claimed.

What is claimed is:

1. A method of creating an upcoming concert playlist by executing computer-executable instructions stored on a non-transitory computer-readable medium, the method comprises the steps of:
   providing a concert database with a plurality of concerts, wherein each of the plurality of concerts includes an artist listing, a venue listing, a date listing and a location listing;
   providing a music database with a plurality of artist tracks;
   providing a music playing software;
   organizing the plurality of concerts by the artist listing, the venue listing or the location listing;
   determining a list of available concerts by narrowing the plurality of concerts through a plurality of concert search criteria;
   displaying the list of available concerts on a graphic user interface, wherein the list of available concerts includes a plurality of concert selection check boxes;
   narrowing the plurality of artist tracks through the plurality of concert selection check boxes and a plurality of music narrowing criteria in order to create a plurality of narrowed artist tracks;
   generating a music playlist by sending the plurality of narrowed artist tracks to the music playing software;
   prompting to select from the plurality of concert search criteria by displaying the plurality of concert search criteria on the graphic user interface, wherein the plurality of concert search criteria includes a location criterion, a venue criterion and an artist criterion;
   categorizing the plurality of concerts according to the artist listing upon the artist criterion being selected, to the venue listing upon the venue criterion being selected, or to the location listing upon the location criterion being selected;
   listing each of the plurality of concerts within the list of available concerts with each of the plurality of concert search text boxes;
   prompting to select each of the plurality of concerts from the list of available concerts by the plurality of concert search text boxes;
   retrieving a narrowed artist listing upon each of the plurality of concert search text boxes being selected by finding the artist listing corresponding to each of the plurality of concerts;
   prompting to narrow the plurality of artist tracks through the narrowed artist listing and the plurality of music narrowing criteria, wherein the plurality of music narrowing criteria includes a desired album criterion and a track popularity criterion;
   compiling the plurality of narrowed artists tracks upon each of the plurality of music narrowing criteria being selected; and
   displaying the plurality of date listings corresponding to each of the plurality of concerts within the list of available concerts on the graphic user interface.

2. The method of creating an upcoming concert playlist by executing computer-executable instructions stored on a non-transitory computer-readable medium, the method as claimed in claim 1 comprises the steps of:
   prompting to search the artist listing by providing an artist search text box;
   prompting to enter an artist description within the artist search text box;
   searching the concert database to find the artist description within the artist listing; and
   compiling the list of available concerts by retrieving the plurality of concerts matching the artist description within the artist listing.

3. The method of creating an upcoming concert playlist by executing computer-executable instructions stored on a non-transitory computer-readable medium, the method as claimed in claim 1 comprises the steps of:
   prompting to search the venue listing by providing a venue search text box;
   prompting to enter a venue description within the venue search text box;
   searching the concert database to find the venue description within the venue listing; and
   compiling the list of available concerts by retrieving the plurality of concerts matching the venue description within the venue listing.

4. The method of creating an upcoming concert playlist by executing computer-executable instructions stored on a non-transitory computer-readable medium, the method as claimed in claim 1 comprises the steps of:
   prompting to search the location listing by providing a location search text box;
   prompting to enter a location description within the location search text box;

searching the concert database to find the location description within the location listing; and compiling the list of available concerts by retrieving the plurality of concerts matching the location description within the location listing.

5. The method of creating an upcoming concert playlist by executing computer-executable instructions stored on a non-transitory computer-readable medium, the method as claimed in claim 1 comprises the steps of:

prompting to select a music playlist button in order to generate the music playlist; and sending the narrowed artist tracks to the music playing software.

6. The method of creating an upcoming concert playlist by executing computer-executable instructions stored on a non-transitory computer-readable medium, the method as claimed in claim 5 comprises the steps of:

providing a music playing account; and linking the music playing account with the music playing software in order to send the narrowed artist tracks to the music playing software.

7. The method of creating an upcoming concert playlist by executing computer-executable instructions stored on a non-transitory computer-readable medium, the method as claimed in claim 1 comprises the steps of:

searching the location listing for the plurality of concerts near a user location, wherein the user location is determined by an internet protocol address;

compiling the list of available concerts within the location listing matching the user location; and displaying the list of available concerts on the graphic user interface.

8. The method of creating an upcoming concert playlist by executing computer-executable instructions stored on a non-transitory computer-readable medium, the method as claimed in claim comprises the steps of:

searching the location listing for the plurality of concerts near a user location, wherein the user location is determined by an internet protocol address;

compiling the list of available concerts within the location listing matching the user location; and displaying the list of available concerts on the graphic user interface.

9. A method of creating an upcoming concert playlist by executing computer-executable instructions stored on a non-transitory computer-readable medium, the method comprises the steps of:

providing a concert database with a plurality of concerts, wherein each of the plurality of concerts includes an artist listing, a venue listing, a date listing and a location listing;

providing a video database with a plurality of artist videos;

providing a video playing software;

organizing the plurality of concerts by the artist listing, the venue listing or the location listing;

determining a list of available concerts by narrowing the plurality of concerts through a plurality of concert search criteria;

displaying the list of available concerts on a graphic user interface, wherein the list of available concerts includes a plurality of concert selection check boxes;

narrowing the plurality of artist videos through the plurality of concert selection check boxes and a plurality of video narrowing criteria in order to create a plurality of narrowed artist videos;

generating a video playlist by sending the plurality of narrowed artist videos to the video playing software;

prompting to search the venue listing by providing a venue search text box;

prompting to enter a venue description within the venue search text box;

searching the concert database to find the venue description within the venue listing;

compiling the list of available concerts by retrieving the plurality of concerts matching the venue description within the venue listing;

prompting to search the location listing by providing a location search text box;

prompting to enter a location description within the location search text box;

searching the concert database to find the location description within the location listing;

compiling the list of available concerts by retrieving the plurality of concerts matching the location description within the location listing; and displaying the plurality of date listings corresponding to each of the plurality of concerts within the list of available concerts on the graphic user interface.

10. The method of creating an upcoming concert playlist by executing computer-executable instructions stored on a non-transitory computer-readable medium, the method as claimed in claim 9 comprises the steps of:

prompting to select from the plurality of concert search criteria by displaying the plurality of concert search criteria on the graphic user interface, wherein the plurality of concert search criteria includes a location criterion, a venue criterion and an artist criterion; and categorizing the plurality of concerts according to the artist listing upon the artist criterion being selected, to the venue listing upon the venue criterion being selected, or to the location listing upon the location criterion being selected.

11. The method of creating an upcoming concert playlist by executing computer-executable instructions stored on a non-transitory computer-readable medium, the method as claimed in claim 9 comprises the steps of:

prompting to search the artist listing by providing an artist search text box;

prompting to enter an artist description within the artist search text box;

searching the concert database to find the artist description within the artist listing; and compiling the list of available concerts by retrieving the plurality of concerts matching the artist description within the artist listing.

12. The method of creating an upcoming concert playlist by executing computer-executable instructions stored on a non-transitory computer-readable medium, the method as claimed in claim 9 comprises the steps of:

listing each of the plurality of concerts within the list of available concerts with each of the plurality of concert search text boxes;

prompting to select each of the plurality of concerts from the list of available concerts by the plurality of concert search text boxes;

retrieving a narrowed artist listing upon each of the plurality of concert search text boxes being selected by finding the artist listing corresponding to each of the plurality of concerts;

prompting to narrow the plurality of artist videos through the narrowed artist listing and the plurality of video narrowing criteria, wherein the plurality of video narrowing criteria includes a video quantity criterion and a video information criterion; and compiling the plurality of narrowed artist videos upon each of the plurality of video narrowing criteria being selected.

13. The method of creating an upcoming concert playlist by executing computer-executable instructions stored on a non-transitory computer-readable medium, the method as claimed in claim 9 comprises the steps of:
prompting to select a video playlist button in order to generate the video playlist; and
sending the narrowed artist videos to the video playing software.

14. The method of creating an upcoming concert playlist by executing computer-executable instructions stored on a non-transitory computer-readable medium, the method as claimed in claim 13 comprises the steps of:
providing a video playing account; and
linking the video playing account with the video playing software in order to send the narrowed artist videos to the video playing software.

* * * * *